United States Patent
Boardman et al.

(10) Patent No.: US 10,393,382 B2
(45) Date of Patent: Aug. 27, 2019

(54) MULTI-POINT INJECTION MINI MIXING FUEL NOZZLE ASSEMBLY

(71) Applicant: General Electric Company, Schenectady, NY (US)

(72) Inventors: Gregory Allen Boardman, Liberty Township, OH (US); Pradeep Naik, Bangalore (IN); Manampathy Gangadharan Giridharan, Mason, OH (US); David Albin Lind, Lebanon, OH (US); Jeffrey Michael Martini, Hamilton, OH (US); Clayton S. Cooper, Loveland, OH (US)

(73) Assignee: General Electric Company, Schenectady, NY (US)

(*) Notice: Subject to any disclaimer, the term of this patent is extended or adjusted under 35 U.S.C. 154(b) by 375 days.

(21) Appl. No.: 15/343,634

(22) Filed: Nov. 4, 2016

(65) Prior Publication Data

US 2018/0128490 A1 May 10, 2018

(51) Int. Cl.
*F23R 3/28* (2006.01)
*F23R 3/04* (2006.01)
*F23R 3/14* (2006.01)

(52) U.S. Cl.
CPC ............... *F23R 3/286* (2013.01); *F23R 3/04* (2013.01); *F23R 3/14* (2013.01); *F23R 3/283* (2013.01); *Y02T 50/675* (2013.01)

(58) Field of Classification Search
CPC .... F23R 3/286; F23R 3/04; F23R 3/10; F23R 3/28
See application file for complete search history.

(56) References Cited

U.S. PATENT DOCUMENTS 3,917,173 A 11/1975 Singh
4,100,733 A 7/1978 Striebel et al.
(Continued)

OTHER PUBLICATIONS

Srinivasan et al., "Improving low load combustion, stability, and emissions in pilot-ignited natural gas engines", Journal of Automobile Engineering, Sage journals, vol. 220, No. 2, pp. 229-239, Feb. 1, 2006.
(Continued)

*Primary Examiner* — Steven M Sutherland
(74) *Attorney, Agent, or Firm* — Dority & Manning, P.A.

(57) ABSTRACT

The present disclosure is directed to a fuel injector for a gas turbine engine. The fuel injector includes an end wall, a centerbody, an outer sleeve surrounding the centerbody from the end wall toward the downstream end of the fuel injector, and a thermal management conduit. The centerbody includes an axially extended outer wall and inner wall extended from the end wall toward a downstream end of the fuel injector. The outer wall, the inner wall, and the end wall together define a fluid conduit extended in a first direction toward the downstream end of the fuel injector and in a second direction toward an upstream end of the fuel injector. The outer sleeve and the centerbody define a premix passage radially therebetween and an outlet at the downstream end of the premix passage. The outer sleeve defines a plurality of radially oriented first air inlet ports in circumferential arrangement at a first axial portion of the outer sleeve. The outer sleeve defines a plurality of radially oriented second air inlet ports in circumferential arrangement at a second axial portion of the outer sleeve. The outer sleeve further defines a first fluid passage arranged between each first air inlet port and extended from the end wall. A fluid passage wall extends from the end wall within the first fluid passage to define a second fluid passage extended from the end wall within the first fluid passage. The outer sleeve further defines
(Continued)

a first injection port in fluid communication with the first fluid passage and a second injection port in fluid communication with the second fluid passage. The thermal management conduit is defined by the fluid communication of the fluid conduit and the first fluid passage and the thermal communication of the second fluid passage in adjacent arrangement with the first fluid passage.

20 Claims, 9 Drawing Sheets

(56) References Cited

U.S. PATENT DOCUMENTS

| | | |
|---|---|---|
| 4,177,637 A | 12/1979 | Pask |
| 4,408,461 A | 10/1983 | Bruhwiler et al. |
| 4,412,414 A | 11/1983 | Novick et al. |
| 4,689,961 A | 9/1987 | Stratton |
| 4,967,561 A | 11/1990 | Bruhwiler et al. |
| 5,207,064 A | 5/1993 | Ciokajlo et al. |
| 5,211,675 A | 5/1993 | Bardey et al. |
| 5,265,409 A | 11/1993 | Smith, Jr. et al. |
| 5,307,634 A | 5/1994 | Hu |
| 5,408,830 A * | 4/1995 | Lovett ............... F23D 17/002 239/422 |
| 5,511,375 A | 4/1996 | Joshi et al. |
| 5,592,821 A | 1/1997 | Alary et al. |
| 5,619,855 A | 4/1997 | Burrus |
| 5,622,054 A | 4/1997 | Tingle |
| 5,829,967 A | 11/1998 | Chyou |
| 5,839,283 A | 11/1998 | Dobbeling |
| 5,937,653 A | 8/1999 | Alary et al. |
| 6,038,861 A | 3/2000 | Amos et al. |
| 6,286,298 B1 | 9/2001 | Burrus et al. |
| 6,295,801 B1 | 10/2001 | Burrus et al. |
| 6,331,109 B1 | 12/2001 | Paikert et al. |
| 6,442,939 B1 | 9/2002 | Stuttaford et al. |
| 6,460,339 B2 | 10/2002 | Nishida et al. |
| 6,539,721 B2 | 4/2003 | Oikawa et al. |
| 6,539,724 B2 | 4/2003 | Cornwell et al. |
| 6,564,555 B2 | 5/2003 | Rice et al. |
| 6,594,999 B2 | 7/2003 | Mandai et al. |
| 6,598,584 B2 | 7/2003 | Beck et al. |
| 6,772,594 B2 | 8/2004 | Nishida et al. |
| 6,837,050 B2 | 1/2005 | Mandai et al. |
| 6,837,051 B2 | 1/2005 | Mandai et al. |
| 6,915,637 B2 | 7/2005 | Nishida et al. |
| 6,962,055 B2 | 11/2005 | Chen et al. |
| 7,036,482 B2 | 5/2006 | Beck et al. |
| 7,188,476 B2 | 3/2007 | Inoue et al. |
| 7,200,998 B2 | 4/2007 | Inoue et al. |
| 7,313,919 B2 | 1/2008 | Inoue et al. |
| 7,360,363 B2 | 4/2008 | Mandai et al. |
| 7,565,803 B2 | 7/2009 | Li et al. |
| 7,677,026 B2 | 3/2010 | Conete et al. |
| 7,770,397 B2 | 8/2010 | Patel et al. |
| 7,788,929 B2 | 9/2010 | Biebel et al. |
| 7,810,333 B2 | 10/2010 | Kraemer et al. |
| 7,966,801 B2 | 6/2011 | Umeh et al. |
| 8,161,751 B2 | 4/2012 | Hall |
| 8,276,385 B2 | 10/2012 | Zuo et al. |
| 8,316,644 B2 | 11/2012 | Wilbraham |
| 8,322,143 B2 | 12/2012 | Uhm et al. |
| 8,424,311 B2 | 4/2013 | York et al. |
| 8,511,087 B2 | 8/2013 | Fox et al. |
| 8,528,337 B2 | 9/2013 | Berry et al. |
| 8,539,773 B2 | 9/2013 | Ziminsky et al. |
| 8,590,311 B2 | 11/2013 | Parsania et al. |
| 8,621,870 B2 | 1/2014 | Carroni et al. |
| 8,671,691 B2 | 3/2014 | Boardman et al. |
| 8,701,417 B2 | 4/2014 | Nicholls et al. |
| 8,863,524 B2 | 10/2014 | Karlsson et al. |
| 8,938,971 B2 | 1/2015 | Poyyapakkam et al. |
| 8,943,835 B2 | 2/2015 | Corsmeier et al. |
| 9,091,444 B2 | 7/2015 | Turrini et al. |
| 9,335,050 B2 | 5/2016 | Cunha et al. |
| 9,377,192 B2 | 6/2016 | Hirata et al. |
| 9,388,985 B2 | 7/2016 | Wu et al. |
| 9,416,973 B2 | 8/2016 | Melton et al. |
| 9,423,137 B2 | 8/2016 | Nickolaus |
| 2003/0101729 A1 | 6/2003 | Srinivasan |
| 2011/0016871 A1 | 1/2011 | Kraemer et al. |
| 2011/0083439 A1 | 4/2011 | Zuo et al. |
| 2011/0252803 A1 | 10/2011 | Subramanian et al. |
| 2012/0096866 A1 | 4/2012 | Khan et al. |
| 2012/0131923 A1 | 5/2012 | Elkady et al. |
| 2012/0285173 A1 | 11/2012 | Poyyapakkam et al. |
| 2012/0308947 A1* | 12/2012 | Melton ............... F23R 3/002 431/351 |
| 2013/0042625 A1 | 2/2013 | Barker et al. |
| 2013/0199188 A1 | 8/2013 | Boardman et al. |
| 2013/0239581 A1 | 9/2013 | Johnson et al. |
| 2013/0336759 A1 | 12/2013 | Christians |
| 2014/0060060 A1 | 3/2014 | Bernero et al. |
| 2014/0290258 A1 | 10/2014 | Gerendas et al. |
| 2015/0076251 A1 | 3/2015 | Berry |
| 2015/0128607 A1 | 5/2015 | Lee |
| 2015/0159875 A1 | 6/2015 | Berry et al. |
| 2016/0010856 A1 | 1/2016 | Biagioli et al. |
| 2016/0169110 A1 | 6/2016 | Myers et al. |
| 2016/0209036 A1 | 7/2016 | Cheung |

OTHER PUBLICATIONS

Snyder et al., "Emission and Performance of a Lean-Premixed Gas Fuel Injection System for Aeroderivative Gas Turbine Engines", Journal of Engineering for Gas Turbines and Power, ASME Digital Collection, vol. 118, Issue 1, pp. 38-45, Jan. 1, 1996.

* cited by examiner

MULTI-POINT INJECTION MINI MIXING FUEL NOZZLE ASSEMBLY

FIELD

The present subject matter relates generally to gas turbine engine combustion assemblies. More particularly, the present subject matter relates to a premixing fuel nozzle assembly for gas turbine engines.

BACKGROUND

Aircraft and industrial gas turbine engines include a combustor in which fuel is burned to input energy to the engine cycle. Typical combustors incorporate one or more fuel nozzles whose function is to introduce liquid or gaseous fuel into an air flow stream so that it can atomize and burn. General gas turbine engine combustion design criteria include optimizing the mixture and combustion of a fuel and air to produce high-energy combustion while minimizing emissions such as carbon monoxide, carbon dioxide, nitrous oxides, and unburned hydrocarbons, as well as minimizing combustion tones due, in part, to pressure oscillations during combustion.

However, general gas turbine engine combustion design criteria often produce conflicting and adverse results that must be resolved. For example, a known solution to produce higher-energy combustion is to incorporate an axially oriented vane, or swirler, in serial combination with a fuel injector to improve fuel-air mixing and atomization. However, such a serial combination may produce large combustion swirls or longer flames that may increase primary combustion zone residence time or create longer flames. Such combustion swirls may induce combustion instability, such as increased acoustic pressure dynamics or oscillations (i.e. combustion tones), increased lean blow-out (LBO) risk, or increased noise, or inducing circumferentially localized hot spots (i.e. circumferentially uneven temperature profile that may damage a downstream turbine section), or induce structural damage to a combustion section or overall gas turbine engine.

Additionally, larger combustion swirls or longer flames may increase the length of a combustor section. Increasing the length of the combustor generally increases the length of a gas turbine engine or removes design space for other components of a gas turbine engine. Such increases in gas turbine engine length are generally adverse to general gas turbine engine design criteria, such as by increasing weight and packaging of aircraft gas turbine engines and thereby reducing gas turbine engine fuel efficiency and performance.

Higher-energy combustion may also increase the temperature of the fuel nozzle assembly or combustor surfaces and structures, resulting in structural wear and performance degradation, such as fuel coking (i.e. build-up of oxidized fuel deposits) on fuel nozzle assembly surfaces. Fuel coking may lead to obstructions in fuel flow, such as within fuel injectors or along fuel-air mixing passages, which may reduce fuel nozzle efficiency or render the fuel nozzle inoperable. A known solution is to decrease fuel residence time within the fuel nozzle by reducing the area of a fuel circuit before injecting fuel into a fuel-air premix passage. However, such a solution obviates utilizing the fuel for secondary functions.

Therefore, a need exists for a fuel nozzle assembly that may produce high-energy combustion while further minimizing emissions, combustion instability, structural wear and performance degradation, and while maintaining or decreasing combustor size.

BRIEF DESCRIPTION

Aspects and advantages of the invention will be set forth in part in the following description, or may be obvious from the description, or may be learned through practice of the invention.

The present disclosure is directed to a fuel injector for a gas turbine engine. The fuel injector includes an end wall, a centerbody, an outer sleeve surrounding the centerbody from the end wall toward the downstream end of the fuel injector, and a thermal management conduit. The centerbody includes an axially extended outer wall and inner wall extended from the end wall toward a downstream end of the fuel injector. The outer wall, the inner wall, and the end wall together define a fluid conduit extended in a first direction toward the downstream end of the fuel injector and in a second direction toward an upstream end of the fuel injector. The outer sleeve and the centerbody define a premix passage radially therebetween and an outlet at the downstream end of the premix passage. The outer sleeve defines a plurality of radially oriented first air inlet ports in circumferential arrangement at a first axial portion of the outer sleeve. The outer sleeve defines a plurality of radially oriented second air inlet ports in circumferential arrangement at a second axial portion of the outer sleeve. The outer sleeve further defines a first fluid passage arranged between each first air inlet port and extended from the end wall. A fluid passage wall extends from the end wall within the first fluid passage to define a second fluid passage extended from the end wall within the first fluid passage. The outer sleeve further defines a first injection port in fluid communication with the first fluid passage and a second injection port in fluid communication with the second fluid passage. The thermal management conduit is defined by the fluid communication of the fluid conduit and the first fluid passage and the thermal communication of the second fluid passage in adjacent arrangement with the first fluid passage.

A further aspect of the present disclosure is directed to fuel nozzle including an end wall defining at least one fluid chamber and at least one fluid plenum, a plurality of fuel injectors, and an aft wall. The downstream end of the outer sleeve of each fuel injector is connected to the aft wall. The fluid conduit of the fuel injector is in fluid communication with the fluid chamber. The fluid plenum is in fluid communication with the second fluid passage of each fuel injector.

A still further aspect of the present disclosure is directed to a combustor assembly including a plurality of the fuel nozzles, an inner liner, an outer liner, and a bulkhead. The bulkhead extends radially between an upstream end of the inner liner and the outer liner. The inner liner is radially spaced from the outer liner. The inner liner and outer liner together define a combustion chamber therebetween. The fuel nozzle extends at least partially through the bulkhead and provides a fuel-air mixture to the combustion chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
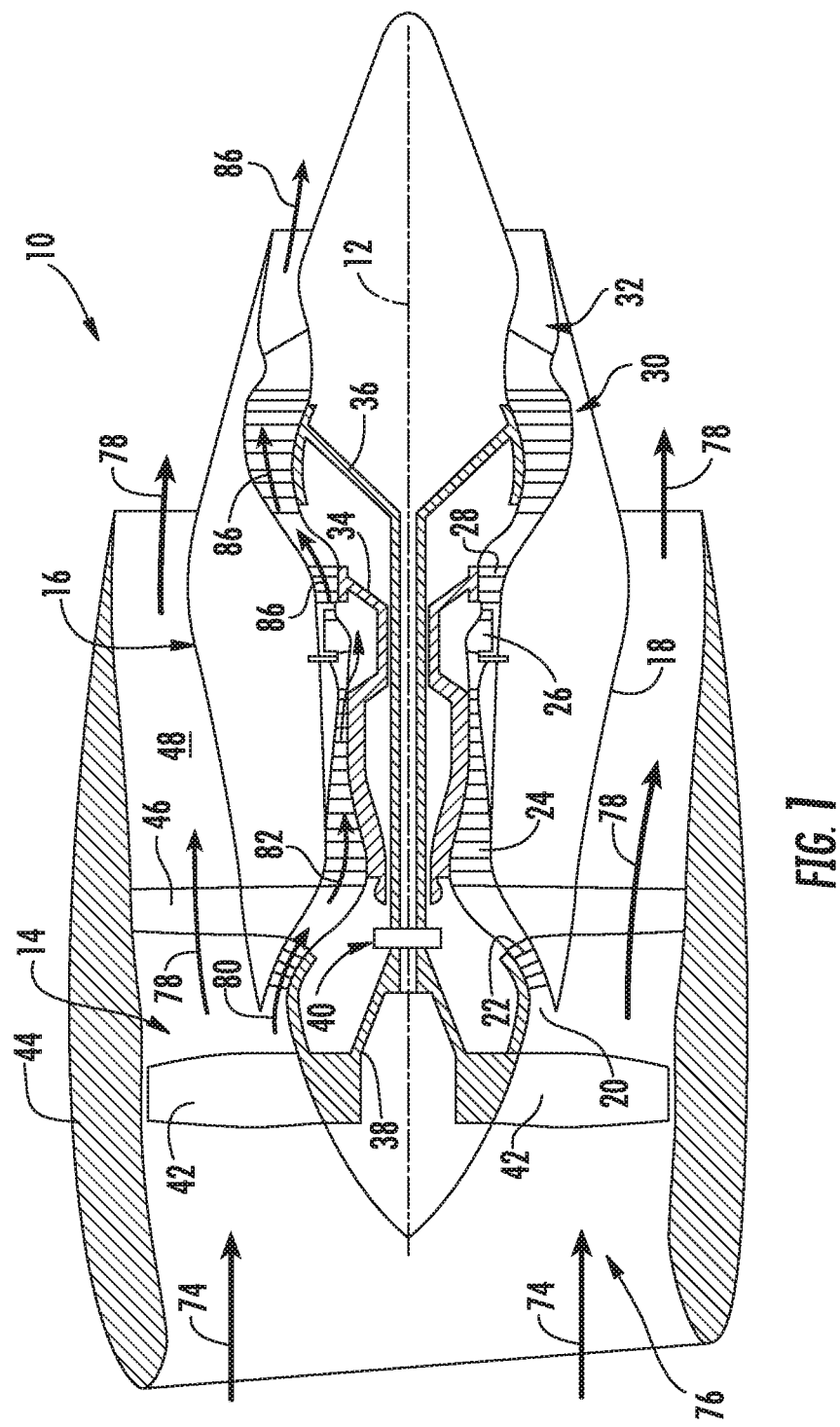
FIG. 1 is a schematic cross sectional view of an exemplary gas turbine engine incorporating an exemplary embodiment of a fuel injector and fuel nozzle assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A multi-point injection mini mixing fuel injector and fuel nozzle assembly is generally provided that may produce high-energy combustion while minimizing emissions, combustion tones, structural wear and performance degradation, and while maintaining or decreasing combustor size. The serial combination of a radially oriented first air inlet port, a first fluid injection port, and a radially oriented second air inlet port radially outward of the first fluid injection port may provide a compact, non- or low-swirl premixed flame at a higher primary combustion zone temperature producing a higher energy combustion with a shorter flame length while maintaining or reducing emissions outputs. The non- or low-swirl premixed flame may mitigate combustor instability, lean blow-out (LBO), or hot spots that may be caused by a breakdown or unsteadiness in a larger flame. Additionally, the shorter flames may reduce combustor axial length and, therefore, gas turbine engine axial length and weight.

The multi-point injection mini mixing fuel injector and fuel nozzle assembly may further mitigate structural wear or performance degradation of the fuel nozzle or combustor assembly by defining a thermal management conduit to transfer thermal energy from a centerbody to an outer sleeve, and from a warmer downstream end to a cooler upstream end. In particular embodiments, the thermal management conduit may mitigate fuel nozzle structural wear and performance degradation, including mitigating fuel coking. Furthermore, the thermal management conduit may enable smaller, more compact fuel nozzle arrangements by reducing structural wear. Still further, the thermal management conduit may further enable the fuel nozzle to produce smaller flames and no- or low-swirl combustion that may mitigate combustion instability and reduce combustor section size.

Referring now to the drawings, FIG. 1 is a schematic partially cross-sectioned side view of an exemplary high by-pass turbofan jet engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16.

In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
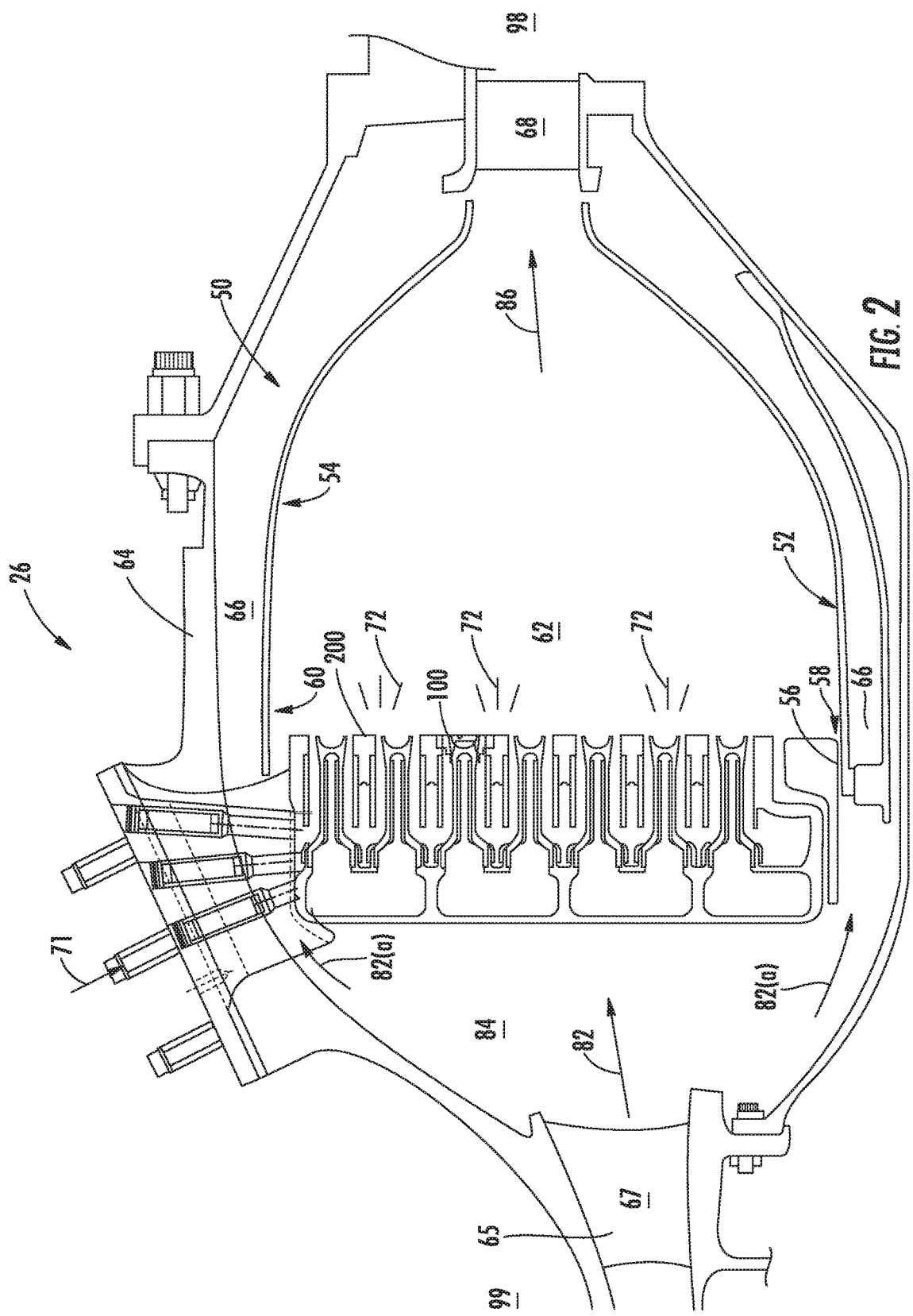
FIG. 2 is an axial cross sectional view of an exemplary embodiment of a combustor assembly of the exemplary engine shown in FIG. 1.

FIG. 2 is a cross sectional side view of an exemplary combustion section 26 of the core engine 16 as shown in FIG. 1. As shown in FIG. 2, the combustion section 26 may generally include an annular type combustor assembly 50 having an annular inner liner 52, an annular outer liner 54 and a bulkhead 56 that extends radially between upstream ends 58, 60 of the inner liner 52 and the outer liner 54 respectfully. In other embodiments of the combustion section 26, the combustor assembly 50 may be a can or can-annular type. As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within an outer casing 64. An outer flow passage 66 may be defined around the inner liner 52 and/or the outer liner 54. The inner liner 52 and the outer liner 54 may extend from the bulkhead 56 towards a turbine nozzle or inlet 68 to the HP turbine 28 (FIG. 1), thus at least partially defining a hot gas path between the combustor assembly 50 and the HP turbine 28. A fuel nozzle 200 may extend at least partially through the bulkhead 56 and provide a fuel-air mixture 72 to the combustion chamber 62.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a prediffuser 65 into a diffuser cavity or head end portion 84 of the combustion section 26.

The prediffuser 65 and CEGV 67 condition the flow of compressed air 82 to the fuel nozzle 200. The compressed air 82 pressurizes the diffuser cavity 84. The compressed air 82 enters the fuel nozzle 200 and into a plurality of fuel injectors 100 within the fuel nozzle 200 to mix with a fuel 71. The fuel injectors 100 premix fuel 71 and air 82 within the array of fuel injectors with little or no swirl to the resulting fuel-air mixture 72 exiting the fuel nozzle 200. After premixing the fuel 71 and air 82 within the fuel injectors 100, the fuel-air mixture 72 burns from each of the plurality of fuel injectors 100 as an array of compact, tubular flames stabilized from each fuel injector 100.

Typically, the LP and HP compressors 22, 24 provide more compressed air to the diffuser cavity 84 than is needed for combustion. Therefore, a second portion of the compressed air 82 as indicated schematically by arrows 82(a) may be used for various purposes other than combustion. For example, as shown in FIG. 2, compressed air 82(a) may be routed into the outer flow passage 66 to provide cooling to the inner and outer liners 52, 54. In addition or in the alternative, at least a portion of compressed air 82(a) may be routed out of the diffuser cavity 84. For example, a portion of compressed air 82(a) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 3:
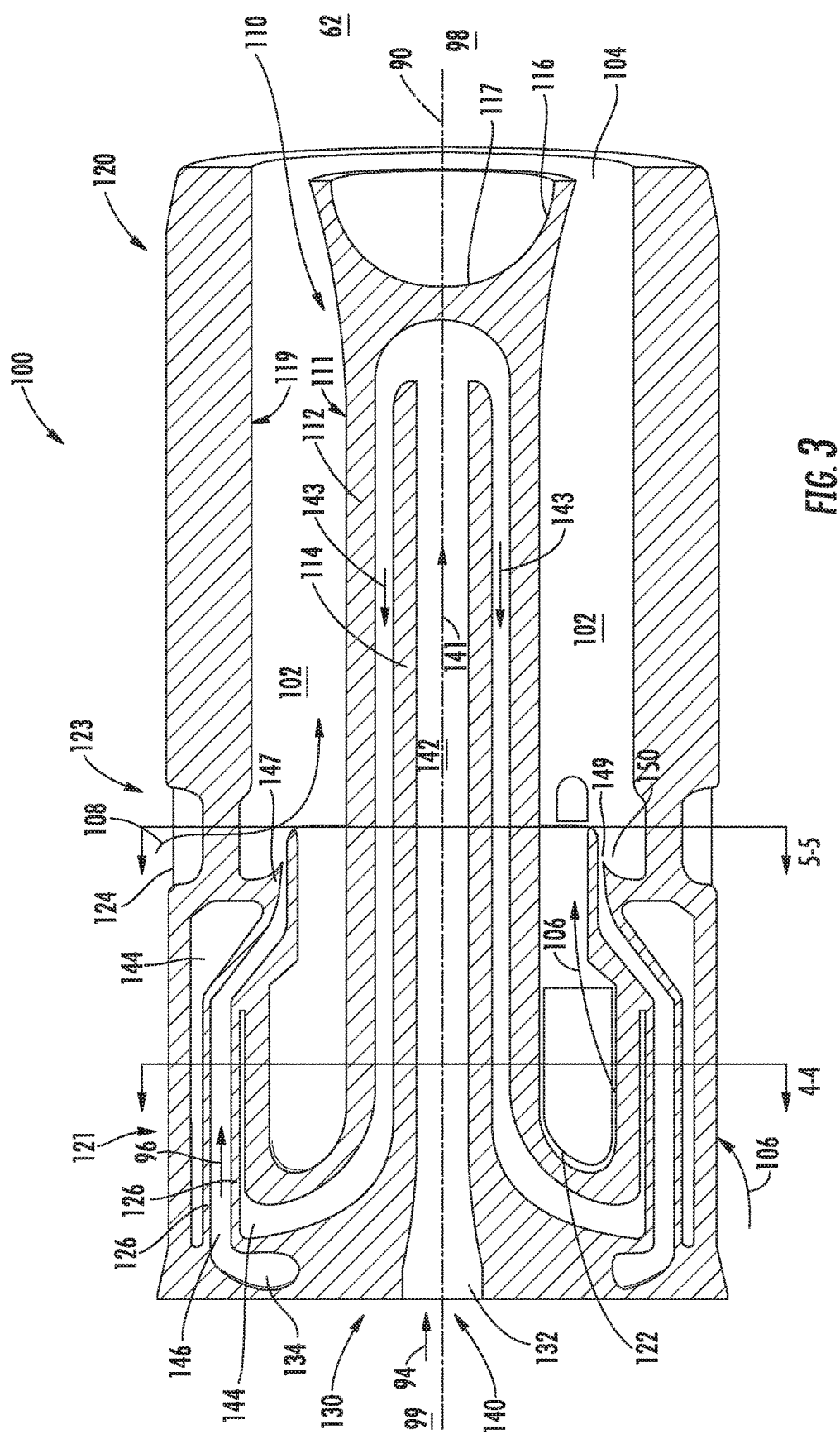
FIG. 3 is an axial cross sectional side view of an exemplary embodiment of a fuel injector for the combustor assembly shown in FIG. 2.

Referring now to FIG. 3, an axial cross sectional side view of an exemplary embodiment of a multi-point injection mini mixing fuel injector 100 (herein referred to as "fuel injector 100") for a gas turbine engine is provided. The fuel injector 100 includes a centerbody 110, an outer sleeve 120, an end wall 130, and a thermal management conduit 140. The centerbody 110 includes an axially extended outer wall 112 and an axially extended inner wall 114. The outer wall 112 and the inner wall 114 extend from the end wall 130 toward a downstream end 98 of the fuel injector 100. The outer wall 112, the inner wall 114, and the end wall 130 together define a fluid conduit 142. The fluid conduit 142 extends in a first direction 141 toward the downstream end 98 of the fuel injector 100 and in a second direction 143 toward an upstream end 99 of the fuel injector 100.

The outer sleeve 120 surrounds the centerbody 110 from the end wall 130 toward the downstream end 98 of the fuel injector 100. The outer sleeve 120 and the centerbody 110 together define a premix passage 102 therebetween and an outlet 104. The centerbody 110 may further define a centerbody surface 111 radially outward of the outer wall 112 and along the premix passage 102. The outer sleeve 120 may further define an outer sleeve surface 119 radially inward of the outer sleeve 120 and along the premix passage 102. The outlet 104 is defined at the downstream end 98 of the premix passage 102 of the fuel injector 100. The outer sleeve 120 defines a plurality of radially oriented first air inlet ports 122 in circumferential arrangement at a first axial portion 121 of the outer sleeve 120. The outer sleeve 120 further defines a plurality of radially oriented second air inlet ports 124 in circumferential arrangement at a second axial portion 123 of the outer sleeve 120.

The outer sleeve 120 defines a first fluid passage 144, arranged between each first air inlet port 122 and extended from the end wall 130. The outer sleeve 120 includes a fluid passage wall 126 extended from the end wall 130. The fluid passage wall 126 defines a second fluid passage 146 extended from the end wall 130 and within the first fluid passage 144. The outer sleeve 120 also defines a first fluid injection port 145 in fluid communication with the first fluid passage 144 and a second fluid injection port 147 in fluid communication with the second fluid passage 146.

The outer sleeve further defines an annular lip 149 extended axially toward the downstream end 98 of the fuel injector 100. The lip 149 extends from the first fluid injection port 145 and/or the second fluid injection port 147 into the premix passage 102. In various embodiments, the lip 149 is disposed radially inward of the radially oriented second air inlet ports 124. The lip 149 may further extend from radially outward of each first and second fluid injection port 145, 147 to radially inward of each fluid injection port 145, 147. The lip 149 may define a plain jet flow of a fuel from the first fluid injection port 145 and/or the second fluid injection port 147 into the premix passage 102 as the fuel mixes with the first and second streams of air 106, 108. In various embodiments, the lip 149 and the plurality of grooves 150 may further define a prefilming flow of the fuel as it mixes with the first and second streams of air 106, 108.

Figure 5:
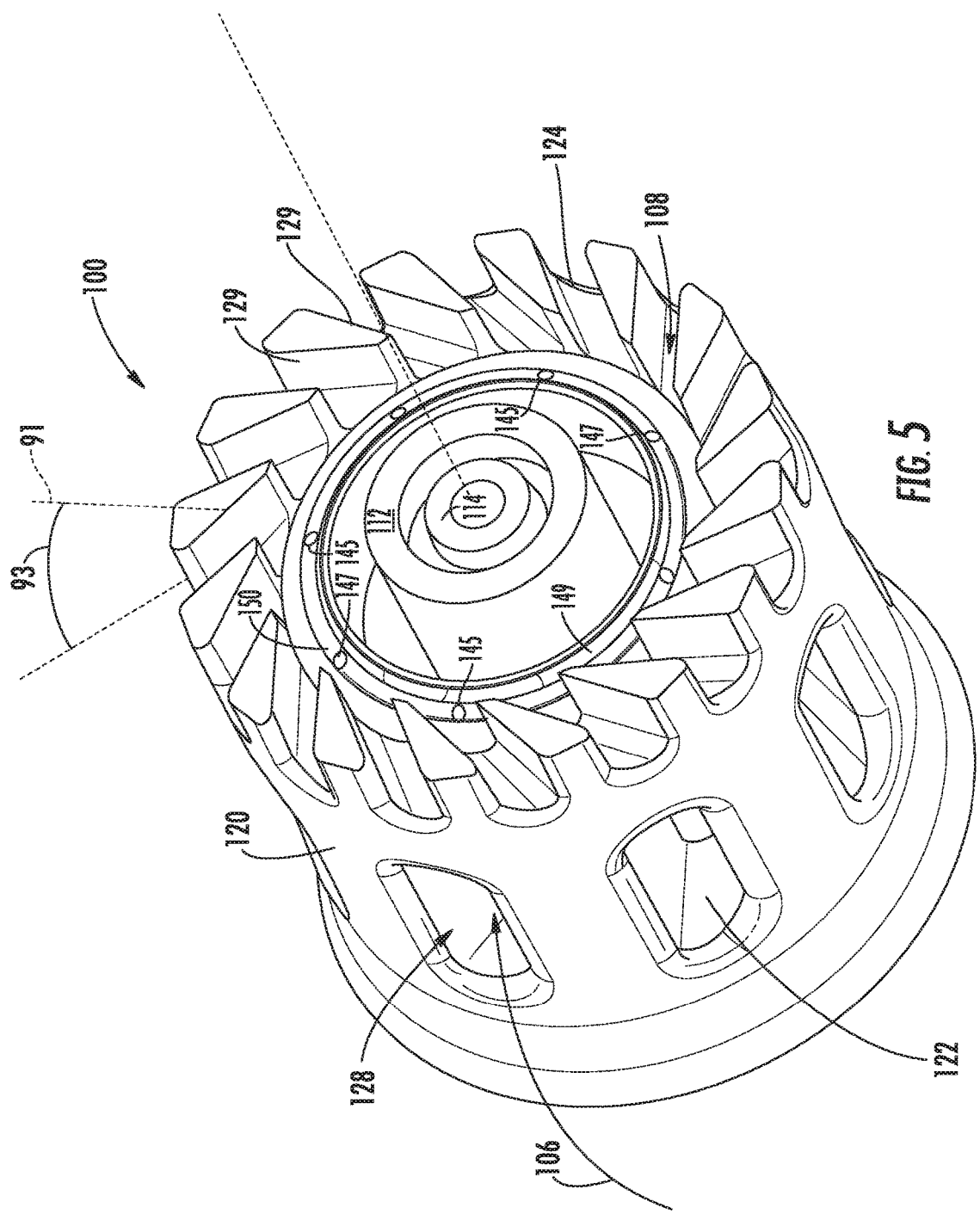
FIG. 5 is a cross sectional perspective view of the exemplary embodiment of the fuel injector shown in FIG. 3 at plane 5-5.

In one embodiment, the lip 149 defines a groove 150 extended circumferentially from one or more first and/or second fluid injection ports 145, 147. In one embodiment (as shown in FIG. 5), the groove 150 is continuous from each fluid injection port 145, 147 circumferentially around the annular lip 149. In another embodiment, the groove 150 is circumferentially segmented such that a portion of the first and/or second fluid injection ports 145, 147 are connected by the groove 150. In still other embodiments, the groove 150 may define a weir structure such that at least a portion of the groove 150 extends toward the downstream end 98 of the fuel injector 100.

The thermal management conduit 140 is defined by the fluid communication of the fluid conduit 142 and the first fluid passage 144 and the thermal communication of the second fluid passage 146 in adjacent arrangement with the first fluid passage 144. The fluid conduit 142 extends from the end wall 130 through the centerbody 110 in the first direction 141 toward the downstream end 98 of the fuel injector 100, then in the second direction 143 toward the upstream end 99 of the fuel injector 100 into the end wall 130. The fluid conduit 142 extends into fluid communication with the first fluid passage 144 within the outer sleeve 120.

The fuel injector 100 flows a first fluid 94 and a second fluid 96 through the thermal management conduit 140, of which either fluid 94, 96 may be a gaseous or liquid fuel, or air, or an inert gas. Gaseous or liquid fuels may include, but are not limited to, fuel oils, jet fuels, propane, ethane, hydrogen, coke oven gas, natural gas, synthesis gas, or combinations thereof. The thermal management conduit 140 may reduce the thermal gradient of the fuel injector 100 by evening the thermal distribution from the upstream end 99 of the fuel injector 100 at the end wall 130 to the downstream end 98 of the centerbody 110, as well as distributing the thermal load from the radially inward centerbody 110 to the radially outward outer sleeve 120.

Furthermore, as a fuel flows through the thermal management conduit 140 and removes thermal energy from the surfaces of the fuel injector 100, the viscosity of the fuel 71 may decrease, thus promoting fuel atomization when injected through the first or second fuel injection ports 145, 147 into the premix passage 102. The larger area of the thermal management conduit 140 from the downstream end 98 to the upstream end 99 and back, and from a radially inward centerbody 110 to a radially outward outer sleeve 120, provide both transfer and dissipation of thermal energy such that fuel coking within the thermal management conduit 140 or the premix passage 102 is mitigated. Additionally, the second fluid passage 146 within and surrounded by the first fluid passage 144 provides further thermal energy transfer and dissipation as the second fluid 96 flows through the second fluid passage 146 and through the second fluid injection port 147.

Referring still to the exemplary embodiment shown in FIG. 3, the first fluid injection port 145 is axially oriented and disposed radially inward of the second air inlet port 124. The serial combination of the radially oriented first air inlet port 122, the axially oriented first fluid injection port 145, and the radially oriented second air inlet port 124 radially outward of the first fluid injection port 145 may provide a compact, non-swirl or low-swirl premixed flame (i.e. shorter length flame) at a higher primary combustion zone temperature (i.e. higher energy output), while meeting or exceeding present emissions standards. As fuel 71 from the first fluid injection port 145, radially between the centerbody 110 and the outer sleeve 120, is introduced to the premix passage 102 between a first stream of air 106 from the first air inlet port 122 and a second stream of air 108 from the second air inlet port 124, the fuel and air mix away from fluid boundary layers along the centerbody surface 111 and the outer sleeve surface 119 along the premix passage 102. The axial orientation of the first fluid injection port 145 releases fuel into the premix passage 102 approximately co-linearly to the direction of the air 106, 108 moving to the downstream end 98 of the premix passage 102 of the fuel injector 100, while preventing fuel contact or build-up on either the centerbody surface 111 or the outer sleeve surface 119. Preventing fuel contact or build-up on either surface 111, 119 mitigates fuel coking within the premix passage 102.

In another embodiment of the fuel injector 100 shown in FIG. 3, the first fluid injection port 145 may be axially oriented and disposed radially inward of the second air inlet port 124. The first fluid injection port 145 may define an oblique angle relative to a longitudinal centerline 90 of the fuel injector 100 (i.e. not co-linear or parallel to the longitudinal centerline 90, nor perpendicular to the longitudinal centerline 90). More specifically, the first fluid injection port 145 may be disposed at an acute angle relative to the longitudinal centerline 90 such that there is a radial component to the injection of the fluid from the first injection port 145 into the premix passage 102.

Referring back to the embodiment shown in FIG. 3, the second fluid injection port 147 may be axially oriented and disposed radially inward of the second air inlet port 126. The second fluid injection port 147 may be in alternating circumferentially adjacent arrangement with each first fluid injection port 145. In one embodiment, the second fluid injection port 147 may be disposed radially inward or outward of each first fluid injection port 145. In yet another embodiment, the first and second fluid injection ports 145, 147 may be in alternating circumferential arrangement along different radii from the longitudinal centerline 90.

Referring still to FIG. 3, the exemplary embodiment of the fuel injector 100 may further include a shroud 116 disposed at the downstream end 98 of the centerbody 110. The shroud 116 may extend axially from the downstream end 98 of the outer wall 112 of the centerbody 110 toward the combustion chamber 62. The downstream end 98 of the shroud 116 may be approximately in axial alignment with the downstream end 98 of the outer sleeve 120. The shroud 116 is annular around the downstream end 98 of the outer wall 112. The shroud 116 may further define a shroud wall 117 radially extended inward of the outer wall 112. The shroud wall 117 protrudes upstream into the centerbody 110. The shroud wall 117 may define a radius that protrudes upstream into the centerbody 110. The upstream end 99 of the shroud wall 117 may be in thermal communication with the fluid conduit 142. The shroud 116 may provide flame stabilization for the no- or low-swirl flame emitting from the fuel injector 100.

The centerbody surface 111 of the fuel injector 100 may extend radially toward the outer sleeve surface 119 to define a lesser diameter at the outlet 104 than upstream of the outlet 104 of the premix passage 102. In the embodiment shown in FIG. 3, the premix passage 102 defines a diameter at the outlet 104 less than a diameter upstream of the outlet 104. As shown in FIG. 3, the centerbody surface 111 at the shroud 116 extends radially toward the outer sleeve surface 119 to define a lesser diameter at the outlet 104 than upstream of the outlet 104 and the shroud 116. In another embodiment, at least a portion of the outer sleeve surface 119 may extend radially outward away from the longitudinal centerline 90. The centerbody surface 111 and the outer sleeve surface 119 defining a decreasing diameter in the premix passage 102 downstream until the outlet 104 may increase the velocity of the fuel-air mixture in the premix passage 102, thereby increasing the efficiency of the mixture and resulting flame.

In still other embodiments, the centerbody surface 111 and the outer sleeve surface 119 may define a parallel relationship such that the area remains constant through the premix passage 102 and the outlet 104. Furthermore, in yet other embodiments, the centerbody surface 111 and the outer sleeve surface 119 may define a parallel relationship while extending radially from the longitudinal centerline 90 (i.e. the diameter remains approximately constant between the centerbody surface 111 and the outer sleeve surface 119).

Referring still to FIG. 3, the end wall 130 may further define a fluid chamber 132 and a fluid plenum 134. The fluid chamber 132 is in fluid communication with the fluid conduit 142 of the centerbody 110. The fluid plenum 134 is in fluid communication with the second fluid passage 146 of the outer sleeve 120. The fluid plenum 134 may extend at least partially circumferentially through the end wall 130. The fluid plenum 134 extends toward the downstream end 98 of the fuel injector 100 to fluidly communicate with the second fluid passage 146.

In one embodiment of the fuel injector 100 including the fluid chamber 132 and the fluid plenum 134, the fluid chamber 132 flows the first fluid 94 and the fluid plenum 134 flows the second fluid 96. In various embodiments, the first and second fluids 94, 96 are controlled, actuated, pressurized, flowed, or otherwise fluidly separate and independent of one another. In one embodiment of the fuel injector 100, the first fluid 94 is a gaseous fuel and flows from the fluid chamber 132 through the fluid conduit 142 within the centerbody 110. The first fluid 94 receives thermal energy from the centerbody 110 as the first fluid 94 flows through the fluid conduit 142 and into the first fluid passage 144. The first fluid 94 flows through the first fluid passage 144 and into the premix passage 102 through the first fluid injection port 145. The first fluid 94 mixes with the first stream of air 106 entering through the first air inlet port 122 and with the second stream of air 108 entering through the second air inlet port 124.

In another embodiment of the fuel injector 100, the first fluid 94 flows from the fluid chamber 132 through the fluid conduit 142, first fluid passage 144, and first fluid injection port 145 into the premix passage 102 as air or an inert gas. In one embodiment, the air may further be cooled air, such as from a compressor bleed or external air source. The second fluid 96, as a liquid fuel, flows from the fluid plenum 134 through the second fluid passage 146 and through the second fluid injection port 147 into the premix passage 102. The cooler first fluid 94 may receive thermal energy from the thermal communication of the second fluid 96 within the second fluid passage 146, of which the second fluid passage 146 is within the first fluid passage 144.

In still another embodiment, the fuel injector 100 may provide thermal energy from the first fluid passage 144 to the second fluid 96 in the second fluid passage 146. Heating the second fluid 96 may decrease viscosity and aid atomization of the second fluid within the premix passage 102, thereby improving mixing and combustion efficiency. In still yet other embodiments, all or part of the thermal management conduit 140 may be cooled or purged with the first or second fluid 94, 96 as air or an inert gas.

Figure 4:
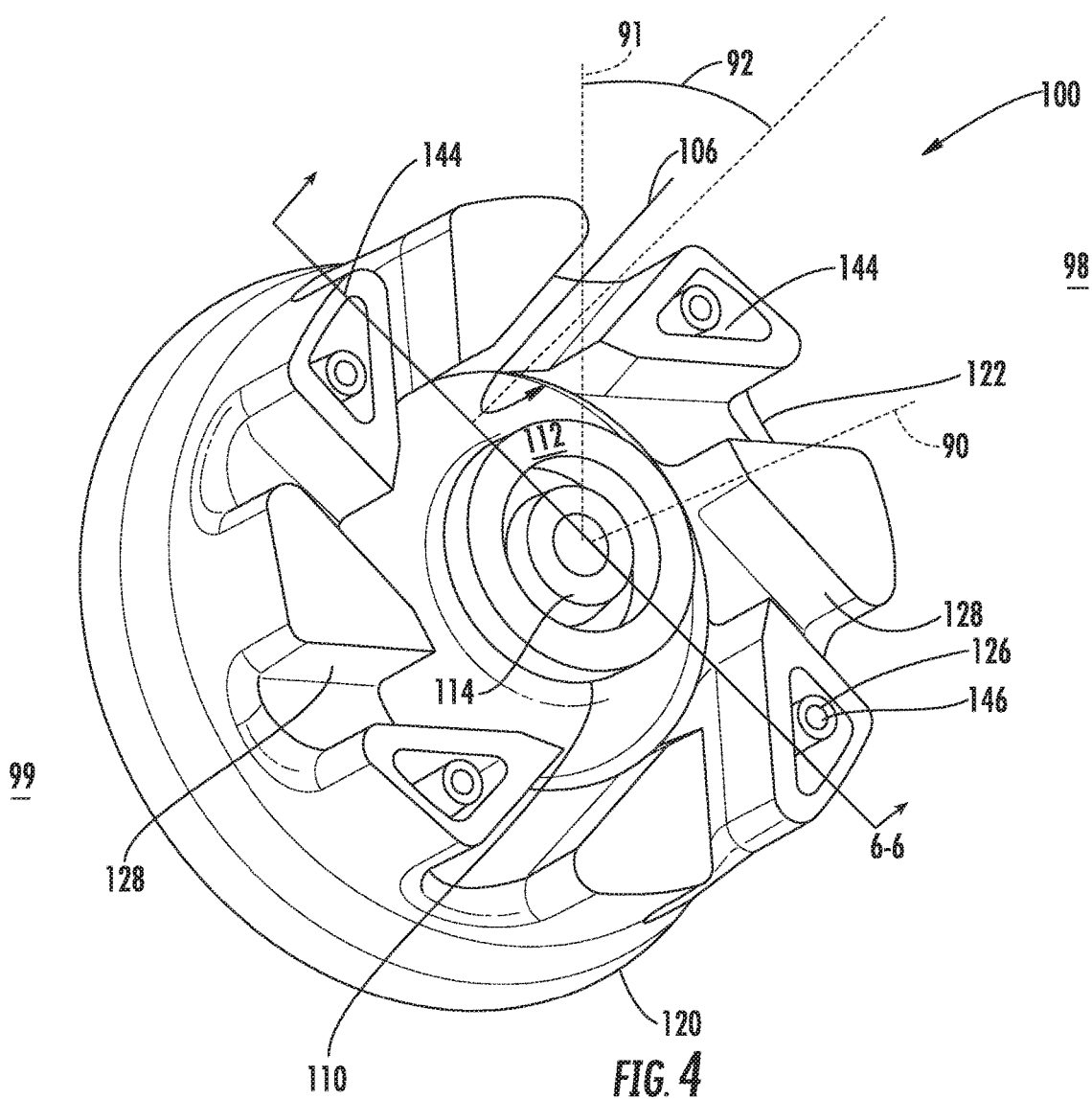
FIG. 4 is a cross sectional perspective view of the exemplary embodiment of the fuel injector shown in FIG. 3 at plane 4-4.

Referring now to FIG. 4, a cross sectional perspective view of an exemplary embodiment of the fuel injector of FIG. 3 at plane 4-4 is shown. The outer sleeve 120 defines a first air inlet port wall 128 extending radially through the outer sleeve 120. The first air inlet port walls 128 further define a swirl angle 92 for the first stream of air 106 entering through the first air inlet port 122. The swirl angle 92 is relative to a vertical reference line 91 extending radially from the longitudinal centerline 90.

In one embodiment, the first air inlet port walls 128 may define the swirl angle 92 to induce a clockwise or a counterclockwise flow of the first stream of air 106. For example, the swirl angle 92 may be about 35 to about 65 degrees relative to the vertical reference line 91 as viewed toward the upstream end 99. In another embodiment, the swirl angle 92 may be about −35 to about −65 degrees relative to the vertical reference line 91 as viewed toward the upstream end 99. In still other embodiments, the first air inlet port walls 128 may define the swirl angle 92 to induce little or no swirl to the first stream of air 106 entering the premix passage 102. For example, the swirl angle 92 may be about zero degrees relative to the vertical reference line 91.

Referring back to FIG. 4, the first air inlet port wall 128 further defines the first fluid passage 144 in the outer sleeve 120. The first fluid passage 144 extends axially from the end wall 130 within the first air inlet port walls 128 between each of the circumferentially arranged first inlet air ports 124. Within at least one of the first fluid passages 144 is a fluid passage wall 126 defining the second fluid passage 146. The second fluid passage 146 is fluidly segregated from the first fluid passage 144 by the fluid passage wall 126. However, the fluid passage wall 126 provides thermal communication, including thermal energy transfer, between the fluids 94, 96 within the first and second fluid passages 144, 146.

Referring now to FIG. 5, a cross sectional perspective view of the exemplary embodiment of the fuel injector 100 of FIG. 3 at plane 5-5 is shown. In the embodiment shown, the outer sleeve 120 defines a second air inlet port wall 129 extending radially through the outer sleeve 120. The second air inlet port walls 129 further define the swirl angle 93 for the second stream of air 108 entering through the second air inlet port 124. The second air inlet port 124 induces swirl on the second stream of air 108 entering the premix passage 102. The second air inlet port 124 may induce a clockwise or a counterclockwise flow of the second stream of air 108. In one embodiment, the swirl angle 93 may be about 35 to about 65 degrees relative to the vertical reference line 91 as viewed toward the upstream end 99. In another embodiment, the swirl angle 92 may be about −35 to about −65 degrees relative to the vertical reference line 91 as viewed toward the upstream end 99. In still other embodiments, the second air inlet port walls 129 may define the swirl angle 93 to induce little or no swirl to the second stream of air 108 entering the premix passage 102. For example, the swirl angle 93 may be about zero degrees relative to the vertical reference line 91.

Referring to FIGS. 4 and 5, in one embodiment the first and second air inlet ports 122, 124 may induce a co-swirl to the first and second streams of air 106, 108. For example, the first and second air inlet port walls 128, 129 may each define a positive or negative swirl angle 92 in which the first and second streams of air 106, 108 each swirl clockwise or counterclockwise in the same direction. In another embodiment, the first and second air inlet ports 122, 124 may induce a counter-swirl to the first and second streams of air 106, 108 (i.e. the first stream of air 106 rotates opposite of the second stream of air 108). For example, the first air inlet port wall 128 may define a positive swirl angle 92 in which the first stream of air 106 swirls clockwise while the second air inlet port wall 129 may define a negative swirl angle 93 in which the second stream of air 108 swirls counterclockwise.

Referring now to FIGS. 3-5, the second fluid injection port 147 may be axially oriented and disposed radially inward of the second air inlet port 126. The second fluid injection port 147 may be in alternating circumferentially adjacent arrangement with each first fluid injection port 145. FIG. 5 shows an embodiment of the fuel injector 100 including four first fluid injection ports 145 in alternating circumferential arrangement with four second fluid injection ports 147. FIG. 4 shows a perspective cutaway view showing four second fluid passages 146 extending within a plurality of the first air inlet port walls 128 of the outer sleeve 120 defining the first fluid passages 144. FIGS. 3-5 together show the first fluid passages 144 extending axially from the upstream end 99 to the downstream end 98 and extending at least partially circumferentially to the first fluid injection ports 147 arranged in circumferentially alternating arrangement with the second fluid injection ports 147. In other embodiments, the fuel injector 100 may define fewer or additional fluid injection ports 145, 147 and fluid passages 144, 146. In still other embodiments, the fuel injector 100 may define fluid injection ports 145, 147 at different radii. In yet other embodiments, the fuel injector 100 may define the fluid injection ports 145, 147 in asymmetric arrangement.

The embodiment depicted in FIG. 5 further shows the lip 149 defining the groove 150 circumferentially around the lip 149. The groove 150 may be defined in the lip 149 to coalesce a liquid fuel from the first and/or second fluid injection ports 145, 147. In one embodiment, groove 150 defines a width and depth at least approximately equal to a diameter of each first or second fluid injection port 145, 147. In still other embodiments, the first and/or second fluid injection ports 145, 147 may extend into the groove 150 co-linearly to the longitudinal centerline 90. In other embodiments, the first and/or second fluid injection ports 145, 147 may extend into the groove 150 at an oblique angle (i.e. not parallel or perpendicular), or a plurality of angles (e.g. compound angles) relative to the longitudinal centerline 90 and/or the fluid injection ports 145, 147.

Figure 6:
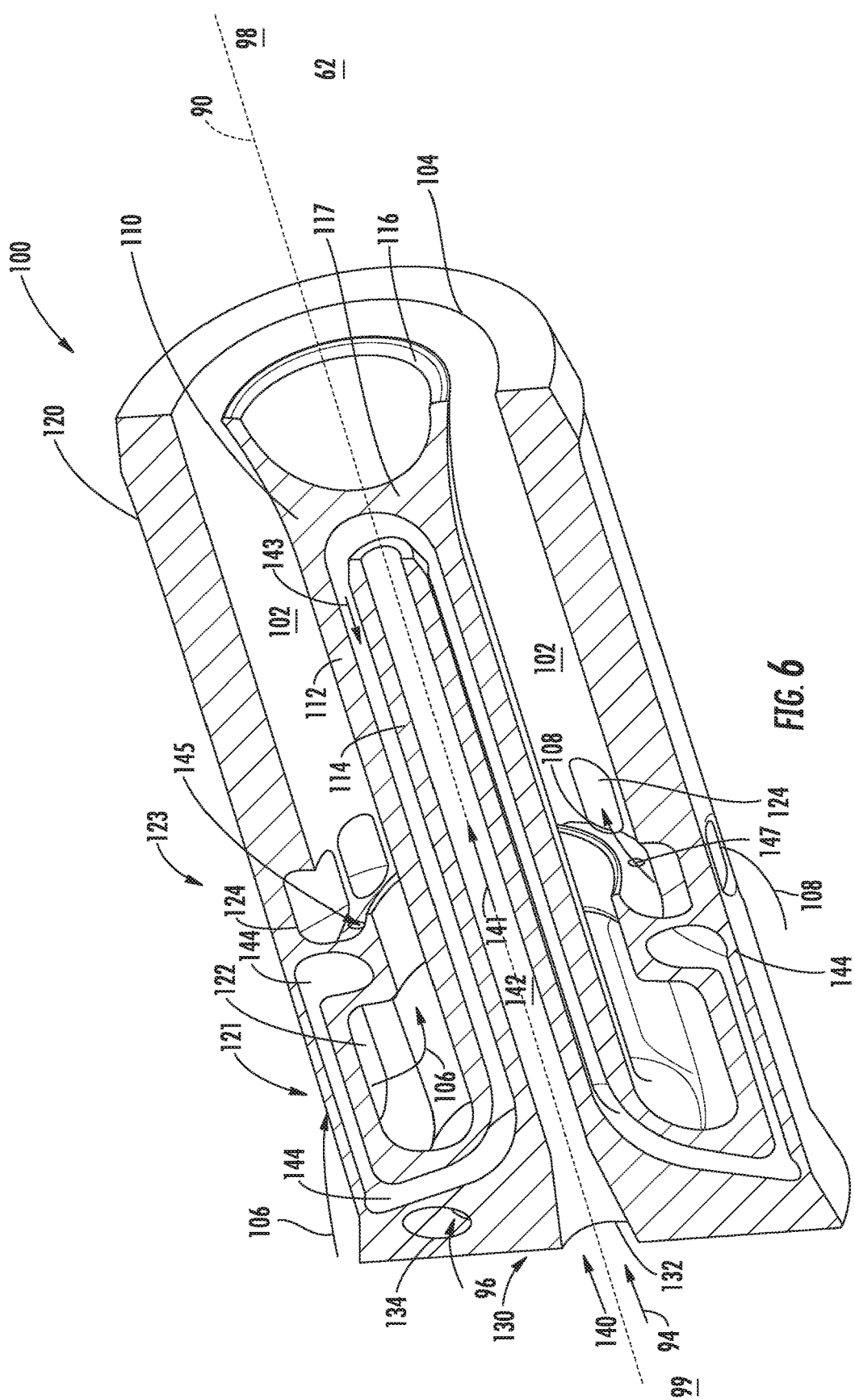
FIG. 6 is an axial cross sectional cutaway perspective view of the exemplary embodiment of the fuel injector shown in FIG. 4 at plane 6-6.

Referring now to FIG. 6, a cross sectional cutaway perspective view of an exemplary embodiment of the fuel injector 100 is provided from plane 6-6 from FIG. 4. The embodiment of the fuel injector 100 shown in FIG. 6 may be configured in substantially the same manner as described in regard to FIGS. 3-5. The embodiment in FIG. 6 shows the first fluid passage 144 as extending axially from the upstream end 99 toward the downstream end 98 and extending at least partially circumferentially within the outer sleeve 120. Additionally, the fluid plenum 134 may extend at least partially circumferentially through the end wall 130. The fluid plenum 134 extends toward the downstream end 98 of the fuel injector 100 to fluidly communicate with the second fluid passage 146.

Figure 7:
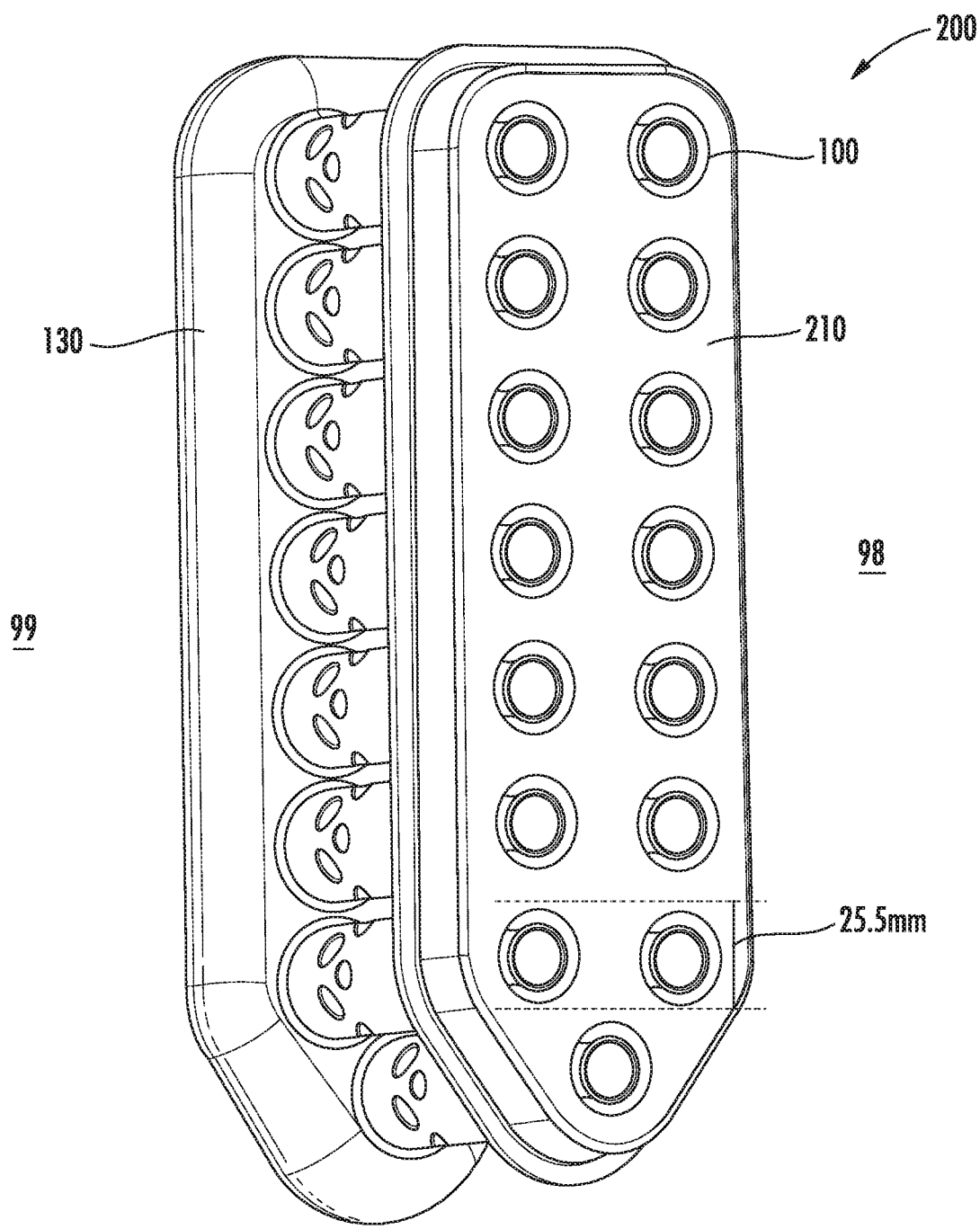
FIG. 7 is a perspective view of an exemplary embodiment of a fuel nozzle including a plurality of an exemplary fuel injector.

Referring now to FIG. 7, a perspective view of an exemplary embodiment of a fuel nozzle 200 is shown. The fuel nozzle 200 includes an end wall 130, a plurality of fuel injectors 100, and an aft wall 210. The plurality of fuel injectors 100 may be configured in substantially the same manner as described in regard to FIGS. 3-6. However, the end wall 130 of the fuel nozzle 200 defines at least one fluid chamber 132 and at least one fluid plenum 134, each in fluid communication with the plurality of fuel injectors 100. The aft wall 210 is connected to the downstream end 98 of the outer sleeve 120 of each of the plurality of fuel injectors 100. The fuel nozzle 200 defines a ratio of at least one fuel injector 100 per about 25.5 millimeters extending radially from the engine centerline 12.

Figure 8:
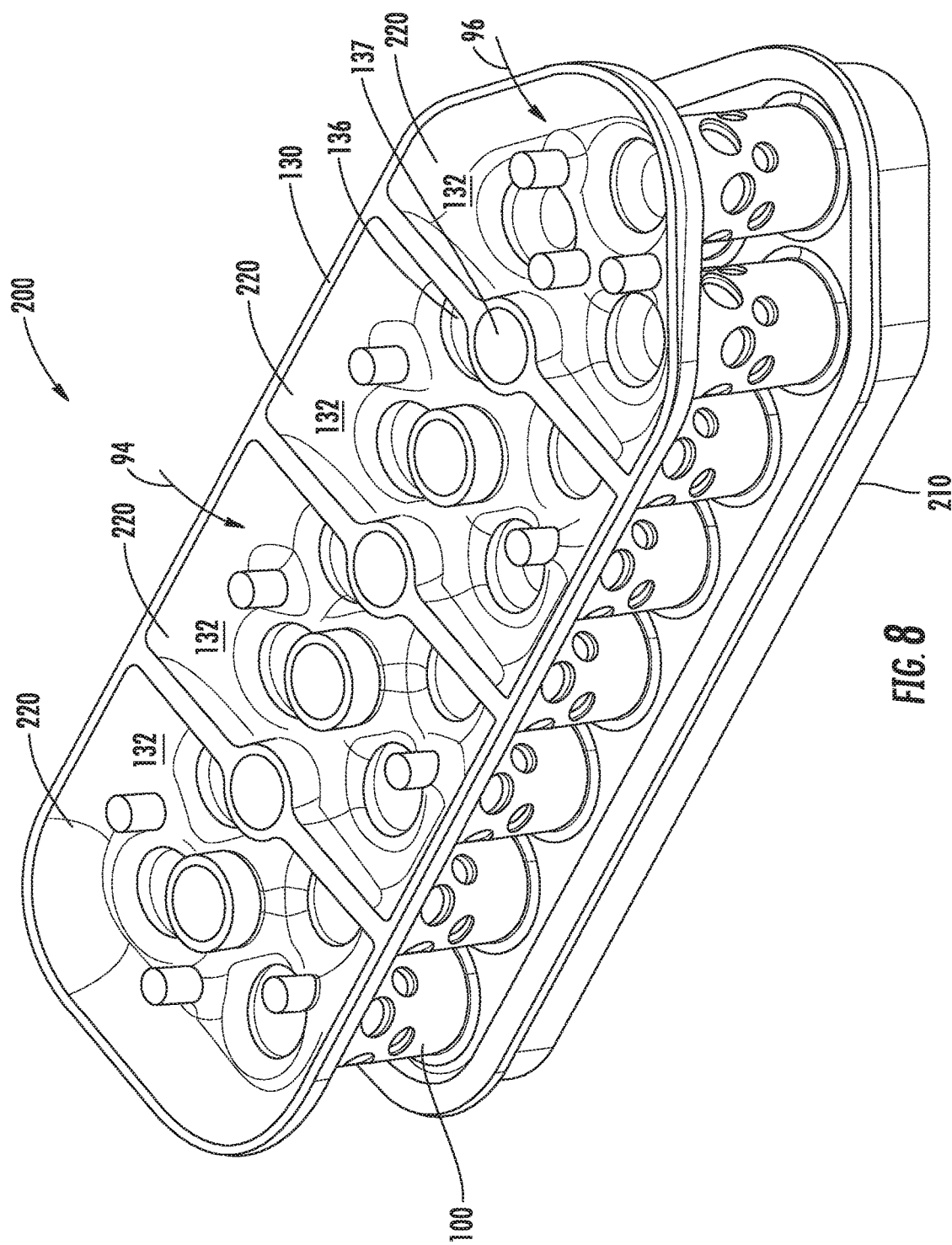
FIG. 8 is a cutaway perspective view of the exemplary fuel nozzle shown in FIG. 7.

Referring now to FIG. 8, a cutaway perspective view of the exemplary embodiment of the fuel nozzle 200 of FIG. 7 is shown. FIG. 8 shows a cutaway view of the end wall 130, a plurality of fluid chambers 132, and a plurality of fluid plenums 134. The fuel nozzle 200 may define a plurality of independent fluid zones 220 providing independently and variably articulated fluid 94, 96 into each fluid chamber 132 or fluid plenum 134 for each fuel nozzle 200. Independent and variable controllability includes setting and producing fluid pressures, temperatures, flow rates, and fluid types through each fluid chamber 132 separate from another fluid chamber 132. The plurality of fluid plenums 134 may be configured substantially similarly.

In the embodiment shown in FIG. 8, each independent fluid zone 220 may define separate fluids, fluid pressures and flow rates, and temperatures for the fluid through each fuel injector 100. In another embodiment, the independent fluid zones 220 may define different fuel injector 100 structures within each independent fluid zone 220. For example, the fuel injector 100 in a first independent fluid zone 220 may define different radii or diameters from a second independent fluid zone 220 within the thermal management conduit 140, the first and second air inlet ports 122, 124, or the premix passage 102. In still another embodiment, a first independent fluid zone 220 may define features within the fuel injector 100, including the fluid chamber 132 or the fluid plenum 134, that may be suitable as a pilot fuel injector, or as an injector suitable for altitude light off (i.e. at altitudes from sea level up to about 16200 meters).

The independent fluid zones 220 may further enable finer combustor tuning by providing independent control of fluid pressure, flow, and temperature through each plurality of fuel injectors 100 within each independent fluid zone 220. Finer combustor tuning may further mitigate undesirable combustor tones (i.e. thermo-acoustic noise due to unsteady or oscillating pressure dynamics during fuel-air combustion) by adjusting the pressure, flow, or temperature of the fluid through each plurality of fuel injectors 100 within each independent fluid zone 220. Similarly, finer combustor tuning may prevent lean blow-out (LBO), promote altitude light off, and reduce hot spots (i.e. asymmetric differences in temperature across the circumference of a combustor that may advance turbine section deterioration). While finer combustor tuning is enabled by the magnitude of the plurality of fuel injectors 100, it is further enabled by providing independent fluid zones 220 across the radial distance of each fuel nozzle 200.

Referring still to FIG. 8, the end wall 130 of the fuel nozzle 200 may further define at least one fuel nozzle air passage wall 136 extending through the fuel nozzle 200 and disposed radially between a plurality of fuel injectors 100. The fuel nozzle air passage wall 136 defines a fuel nozzle air passage 137 to distribute air to the plurality of fuel injectors 100. The fuel nozzle air passage 137 may distribute air to at least a portion of each of the first and second air inlet ports 122, 124. In one embodiment, the fuel nozzle air passage 137 is in thermal communication with each fuel injector 100 to communicate thermal energy from each fuel injector 100. Thermal energy communication from each fuel injector 100 may promote the effectiveness of the thermal management conduit 140 of each fuel injector 100, thereby further enabling the arrangement of at least one fuel injector 100 per 25.5 millimeters extending radially from the longitudinal centerline 12 of the engine 10.

Figure 9:
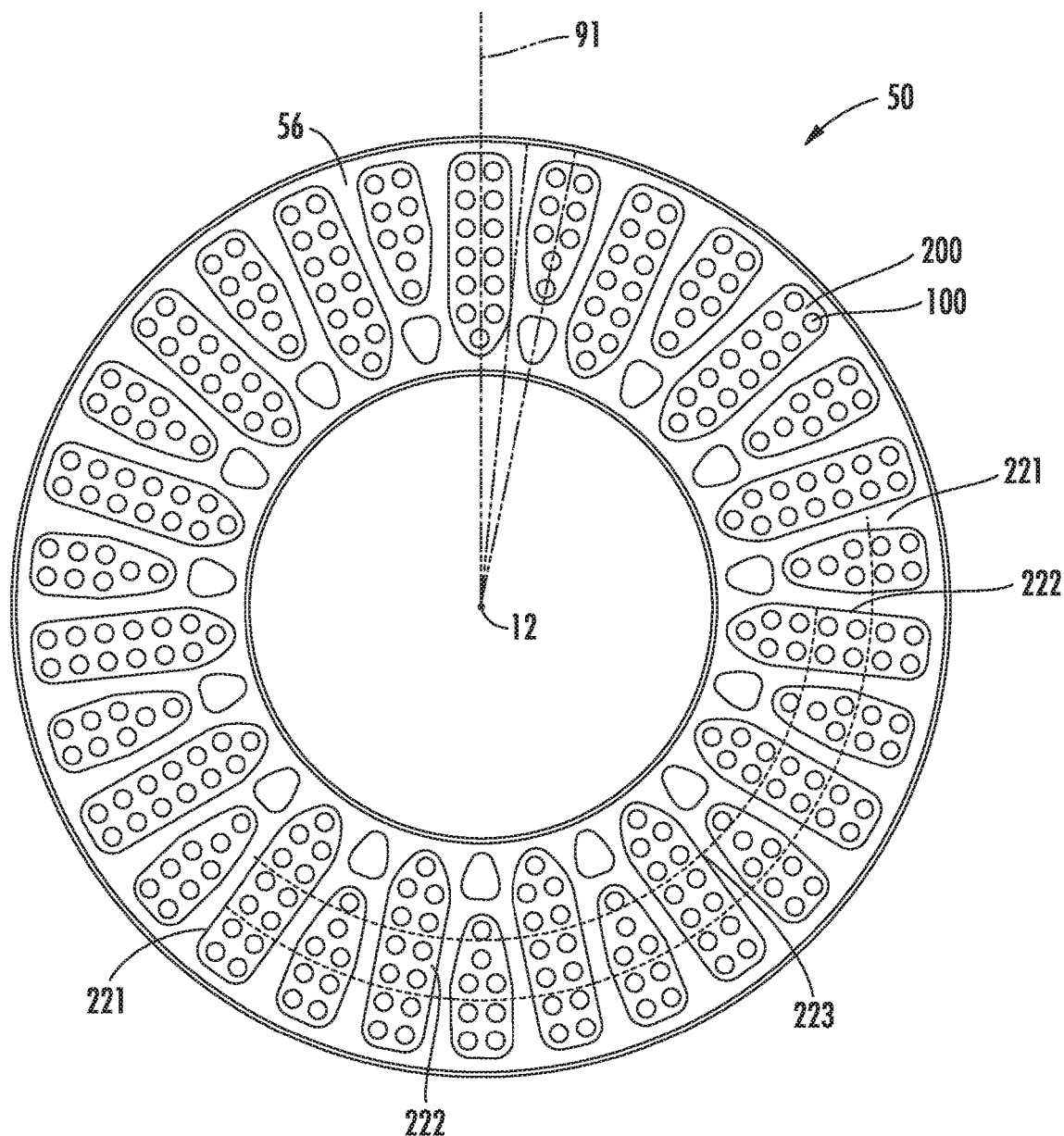
FIG. 9 is a cross sectional view of the exemplary embodiment of the combustor assembly shown in FIG. 2 including a plurality of the exemplary fuel nozzle shown in FIG. 7.

Referring now to FIG. 9, a cross sectional view of the exemplary embodiment of the combustor assembly 50 of FIG. 2 including a plurality of the exemplary fuel nozzle 200 of FIG. 7 is shown viewed toward the upstream end 99. The combustor assembly 50 includes a plurality of fuel nozzles 200 in circumferentially adjacent arrangement. In one embodiment, the combustor assembly 50 may include a first fuel nozzle 201 and a second fuel nozzle 202, in which the first and second fuel nozzles 201, 202 include different quantities of fuel injectors 100 per fuel nozzle 200.

In another embodiment, the fuel injectors 100 may each define a first independent fluid zone 221, a second 222, and a third 223 independent fluid zone. In yet another embodiment, the combustor assembly 50 may further define a plurality of arcs each defining a combustor sector 49. The combustor sectors 49 may each independently articulate a fluid pressure, flow, or temperature to each combustor sector 49. The combustor sectors 49, in conjunction with the independent fluid zones 220 of each fuel nozzle 200, may further advance the controllability of combustor tones, performance, and efficiency for the combustion assembly 50 by controlling and articulating combustion dynamics and operation with further granularity and detail. For example, the combustor assembly 50 may be divided into two, or four, or eight, etc. combustor sectors 49, in which each combustor sector 49 maintains a separate controllability for each fuel nozzle 200 within the combustor sector 49. The fuel nozzles 200 within each combustor sector 49 may provide further control of the combustion profile (i.e. energy output, acoustic noise, emissions, etc.) within each combustor sector 49, each encompassing an arc of the circumference of the combustion assembly 50, while also providing control radially across the combustion assembly 50 (i.e. extending outward from the engine centerline 12).

The fuel injector 100, fuel nozzle 200, and combustor assembly 50 shown in FIGS. 1-9 and described herein may be constructed as an assembly of various components that are mechanically joined or as a single, unitary component and manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or mechanical fasteners, or any combination thereof, may be utilized to construct the fuel injector 100, the fuel nozzle 200, or the combustor assembly 50. Furthermore, the fuel injector 100 and the fuel nozzle 200 may be constructed of any suitable material for turbine engine combustor sections, including but not limited to, nickel- and cobalt-based alloys. Still further, flowpath surfaces, such as, but not limited to, the fluid chamber 132, the fluid plenum 134, the fluid conduit 142, the first or second fluid passages 144, 146, the first or second fluid injectors 145, 147, the first or second air inlet port walls 128, 129, the fluid passage wall 126, or the centerbody surface 111 or outer sleeve surface 119 of the premix passage 102 may include surface finishing or other manufacturing methods to reduce drag or otherwise promote fluid flow, such as, but not limited to, tumble finishing, barreling, rifling, polishing, or coating.

The plurality of multi-point injection mini mixing fuel injectors 100 arranged within a ratio of at least one per about 25.5 millimeters extending radially along the fuel nozzle 200 from the longitudinal centerline 12 of the engine 10 may produce a plurality of well-mixed, compact non- or low-swirl flames at the combustion chamber 62 with higher energy output while maintaining or decreasing emissions. Additionally, the thermal management conduit 140 of the plurality of fuel injectors 100 enables the arrangement of at least one fuel injector 100 within about 25.5 millimeters extending radially. The thermal management conduit 140, as well as the compact flames produced by the fuel injectors 100, may reduce the amount of cooling air extracted from the engine 10 thermodynamic cycle to cool the combustor assembly 50, which thereby improves engine 10 efficiency and performance. The plurality of fuel injectors 100 in the fuel nozzle 200 producing a more compact flame and mitigating strong-swirl stabilization may further mitigate combustor tones caused by vortex breakdown or unsteady processing vortex of the flame. Additionally, the plurality of independent fluid zones may further mitigate combustor tones, LBO, and hot spots while promoting higher energy output, lower emissions, altitude light off, and finer combustion controllability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel injector for a gas turbine engine, the fuel injector comprising:
   an end wall;
   a centerbody comprising an axially extended outer wall and inner wall, wherein the outer wall and inner wall extend from the end wall toward a downstream end of the fuel injector, and wherein the outer wall, the inner wall, and the end wall together define a fluid conduit extended in a first direction toward the downstream end of the fuel injector and in a second direction toward an upstream end of the fuel injector;
   an outer sleeve surrounding the centerbody from the end wall toward the downstream end of the fuel injector, wherein the outer sleeve and the centerbody define a premix passage radially therebetween and an outlet at the downstream end of the premix passage, and wherein the outer sleeve defines a plurality of radially oriented first air inlet ports in circumferential arrangement at a first axial portion of the outer sleeve, and wherein the outer sleeve defines a plurality of radially oriented second air inlet ports in circumferential arrangement at a second axial portion of the outer sleeve, and wherein the outer sleeve further defines a first fluid passage arranged between each first air inlet port and extended from the end wall, and wherein a fluid passage wall extends from the end wall within the first fluid passage, the fluid passage wall defining a second fluid passage extended from the end wall within the first fluid passage, and wherein the outer sleeve further defines a first fluid injection port in fluid communication with the first fluid passage and a second fluid injection port in fluid communication with the second fluid passage; and
   a thermal management conduit defined by the fluid communication of the fluid conduit and the first fluid passage and the thermal communication of the second fluid passage in adjacent arrangement with the first fluid passage.

2. The fuel injector of claim 1, wherein the first fluid injection port is axially oriented and disposed radially inward of the second air inlet port.

3. The fuel injector of claim 2, wherein the first fluid injection port is axially oriented at an oblique angle relative to a longitudinal centerline of the fuel injector.

4. The fuel injector of claim 1, wherein the second fluid injection port is axially oriented and disposed radially inward of the second air inlet port.

5. The fuel injector of claim 1, wherein the first fluid injection port and the second fluid injection port are in alternating circumferentially adjacent arrangement.

6. The fuel injector of claim 1, the fuel injector further comprising:
a shroud disposed at the downstream end of the centerbody, wherein the shroud extends axially from the downstream end of the outer wall of the centerbody, and wherein the shroud is annular around the downstream end of the outer wall.

7. The fuel injector of claim 6, wherein the shroud further includes a shroud wall radially inward of the outer wall, wherein the shroud wall protrudes upstream into the centerbody.

8. The fuel injector of claim 1, wherein a centerbody surface extends radially from a longitudinal centerline toward an outer sleeve surface to define a lesser diameter at the outlet than upstream of the outlet.

9. The fuel injector of claim 1, wherein the outer sleeve further comprises:
a plurality of first air inlet port walls between each circumferentially arranged first air inlet port, wherein the first fluid passage extends axially from the end wall within the first air inlet port walls; and
a plurality of second air inlet port walls between each circumferentially arranged second air inlet port.

10. The fuel injector of claim 9, wherein the plurality of first air inlet port walls define a swirl angle relative to a vertical reference line extending radially from a longitudinal centerline, and wherein the swirl angle is 35 to 65 degrees or −35 to −65 degrees.

11. The fuel injector of claim 9, wherein the plurality of second air inlet port walls define a swirl angle relative to a vertical reference line extending radially from a longitudinal centerline, and wherein the swirl angle is 35 to 65 degrees or −35 to −65 degrees.

12. The fuel injector of claim 1, wherein the end wall further defines a fluid chamber and a fluid plenum, wherein the fluid chamber is in fluid communication with the fluid conduit of the centerbody and the fluid plenum is in fluid communication with the second fluid passage of the outer sleeve.

13. A fuel nozzle for a gas turbine engine, the fuel nozzle comprising:
an end wall defining at least one fluid chamber and at least one fluid plenum;
a plurality of fuel injectors, wherein each fuel injector comprises:
a centerbody comprising an axially extended outer wall and inner wall, wherein the outer wall and inner wall extend from the end wall toward a downstream end of the fuel injector, and wherein the outer wall, the inner wall, and the end wall together define a fluid conduit extended in a first direction toward the downstream end of the fuel injector and in a second direction toward an upstream end of the fuel injector, and wherein the fluid conduit is in fluid communication with the at least one fluid chamber;
an outer sleeve surrounding the centerbody from the end wall toward the downstream end of the fuel injector, wherein the outer sleeve and the centerbody define a premix passage radially therebetween and an outlet at the downstream end of the premix passage, and wherein the outer sleeve defines a plurality of radially oriented first air inlet ports in circumferential arrangement at a first axial portion of the outer sleeve, and wherein the outer sleeve defines a plurality of radially oriented second air inlet ports in circumferential arrangement at a second axial portion of the outer sleeve, and wherein the outer sleeve further defines a first fluid passage arranged between each first air inlet port and extended from the end wall, and wherein a fluid passage wall extends from the end wall within the first fluid passage, the fluid passage wall defining a second fluid passage in fluid communication with the fluid plenum and extended from the end wall within the first fluid passage, and wherein the outer sleeve further defines a first injection port in fluid communication with the first fluid passage and a second injection port in fluid communication with the second fluid passage; and
a thermal management conduit defined by the fluid communication of the fluid conduit and the first fluid passage and the thermal communication of the second fluid passage in adjacent arrangement with the first fluid passage; and
an aft wall, wherein the downstream end of the outer sleeve of each fuel injector is connected to the aft wall.

14. The fuel nozzle of claim 13, wherein the fuel nozzle defines a ratio of at least one fuel injector per about 25.5 millimeters extending radially from a longitudinal centerline.

15. The fuel nozzle of claim 13, wherein the fuel nozzle defines a plurality of independent fluid zones, and wherein the independent fluid zones independently articulate a fluid into each fluid chamber or fluid plenum of the end wall.

16. The fuel nozzle of claim 13, further comprising:
a fuel nozzle air passage wall extending axially through the fuel nozzle and disposed radially between a plurality of fuel injectors, wherein the fuel nozzle air passage wall defines a fuel nozzle air passage to distribute air to the plurality of fuel injectors.

17. A combustor assembly for a gas turbine engine, the combustor assembly comprising:
a fuel nozzle, wherein the fuel nozzle comprises:
an end wall defining at least one fluid chamber and at least one fluid plenum;
a plurality of fuel injectors, wherein each fuel injector comprises:
a centerbody comprising an axially extended outer wall and inner wall, wherein the outer wall and inner wall extend from the end wall toward a downstream end of the fuel injector, and wherein the outer wall, the inner wall, and the end wall together define a fluid conduit extended in a first direction toward the downstream end of the fuel injector and in a second direction toward an upstream end of the fuel injector, and wherein the fluid conduit is in fluid communication with the at least one fluid chamber;
an outer sleeve surrounding the centerbody from the end wall toward the downstream end of the fuel injector, wherein the outer sleeve and the centerbody define a premix passage radially therebetween and an outlet at the downstream end of the premix passage, and wherein the outer sleeve defines a plurality of radially oriented first air inlet ports in circumferential arrangement at a first axial portion of the outer sleeve, and wherein the outer sleeve defines a plurality of radially oriented second air inlet ports in circumferential arrangement at a second axial portion of the outer sleeve, and wherein the outer sleeve further defines a first fluid passage arranged between each first air inlet port and extended from the end wall, and wherein a fluid passage wall extends from the end wall within the first fluid passage, the fluid passage wall defining a second fluid passage in fluid communication with the fluid plenum and extended from the end wall within the first fluid passage, and wherein the outer sleeve further defines a first injection port in fluid communication with the first fluid passage and a second injection port in fluid communication with the second fluid passage; and a thermal management conduit defined by the fluid communication of the fluid conduit and the first fluid passage and the thermal communication of the second fluid passage in adjacent arrangement with the first fluid passage; and an aft wall, wherein the downstream end of the outer sleeve of each fuel injector is connected to the aft wall;

an inner liner;

an outer liner; and a bulkhead, wherein the bulkhead extends radially between an upstream end of the inner liner and the outer liner, and wherein the inner liner is radially spaced from the outer liner, and wherein the inner liner and outer liner together define a combustion chamber therebetween, and wherein the fuel nozzle extends at least partially through the bulkhead and provides a fuel-air mixture to the combustion chamber.

18. The combustor assembly of claim 17, wherein the combustor assembly defines a combustor sector, wherein each combustor sector independently articulates a fluid to the combustion chamber.

19. The combustor assembly of claim 17, wherein the plurality of fuel nozzles defines a plurality of radially spaced independent fluid zones, and wherein each independent fluid zone independently articulates a fluid to the combustion chamber.

20. A gas turbine engine comprising the combustor assembly of claim 17.

* * * * *